April 21, 1925.
1,534,301

P. CONRADSON

GRINDING MACHINE

Filed Feb. 15, 1923     12 Sheets-Sheet 4

WITNESS:
John E. Titus

INVENTOR
PRENTICE CONRADSON
By Chinnock Parker Carlson
Attys

April 21, 1925.

P. CONRADSON

GRINDING MACHINE

Filed Feb. 15, 1923   12 Sheets-Sheet 6

WITNESS
J. M. E. Titus

INVENTOR
PRENTICE CONRADSON
By Chindahl Parker o Carlson
Attys

FIG. 12

April 21, 1925.
P. CONRADSON
GRINDING MACHINE
Filed Feb. 15, 1923     12 Sheets-Sheet 10

1,534,301

WITNESS:
John E. Titus

INVENTOR
PRENTICE CONRADSON
By Chindahl Parker Carlson
Attys

April 21, 1925.  1,534,301
P. CONRADSON
GRINDING MACHINE
Filed Feb. 15, 1923  12 Sheets-Sheet 12

WITNESS:
John E. Titus

INVENTOR
PRENTICE CONRADSON
By Chindohl Parker & Carlson
Attys

Patented Apr. 21, 1925.

1,534,301

UNITED STATES PATENT OFFICE.

PRENTICE CONRADSON, OF EVANSVILLE, WISCONSIN, ASSIGNOR TO GIDDINGS & LEWIS MACHINE TOOL COMPANY, OF FOND DU LAC, WISCONSIN, A CORPORATION OF WISCONSIN.

GRINDING MACHINE.

Application filed February 15, 1923. Serial No. 619,122.

*To all whom it may concern:*

Be it known that I, PRENTICE CONRADSON, a citizen of the United States, residing at Evansville, in the county of Rock and State of Wisconsin, have invented certain new and useful Grinding Machines, of which this is a specification.

This invention relates to a grinding machine of a novel type and as herein shown is embodied in a machine which is particularly intended for internal work, that is, for grinding the bores of bushings, gears and various other parts.

The general object of the invention is to produce a new high-speed grinder which operates automatically and by which internal grinding may be done with great speed and accuracy.

More specifically, it is an object of the invention to produce a machine in which the relative reciprocating motion between the grinding wheel and the piece of work as well as the relative transverse feeding movement therebetween are effected automatically by novel hydraulic operating means.

A further object is to produce a machine of this character which comprises a grinding spindle carriage slidable upon the machine and arranged to move from an idle position remote from the work holder to an operative position wherein the grinding wheel engages the work, and to provide hydraulic mechanism for automatically advancing the said carriage from its idle to its operative position and in the latter position imparting a reciprocating motion to the carriage to move the grinding wheel along the work.

Another object is to combine with a machine having a grinding spindle carriage and operating mechanism as described in the last preceding object, a work spindle carriage or headstock mounted to travel transversely to the direction of travel of the grinding spindle carriage for feeding the work against the grinding wheel, and to provide operating mechanism by which the said headstock will be fed transversely by increments in synchronous relation to the reciprocations of the grinding spindle carriage.

Another object is to provide a novel and improved unitary hydraulic operating mechanism for the grinding spindle carriage and the head stock carriage which is controlled by a single control valve that is operable by the grinding spindle carriage in its movements.

A further object is to provide a novel and improved machine of this character in which two piston and cylinder units are arranged to move the two carriages, said units being supplied with pressure fluid from the same pump or source and to arrange these piston and cylinder units so that the feed mechanism will be actuated by one of said units at the beginning of a stroke of the other unit whereby the feed movement of the work will take place at the end of the stroke of the grinding wheel.

Ancillary objects and advantages of the invention will be apparent from the following detailed description taken in connection with the accompanying drawings, in which—

While various features of my invention are applicable to other types of grinding machines, I have herein disclosed the invention as embodied in an internal grinder and will describe in detail this preferred embodiment. It should be understood, however, that this disclosure is given for the purpose of imparting an understanding of my invention and not with any intention of limiting the invention to the exact construction disclosed. I aim to cover in the subjoined claims all modifications and equivalents falling within the scope of the invention as limited by the state of the prior art.

A brief explanation of the general construction and operation of the machine will facilitate an understanding of the more detailed description to follow.

The machine comprises a hollow base casting on one end of which is mounted a headstock carriage to slide transversely of the base. This carriage has a spindle provided with a chuck or fixture for holding the work to be ground, and a motor for driving said spindle is mounted on the underside of the carriage to travel therewith (see dotted lines in Fig. 3). A transverse feed screw engages this carriage and in a feed box (best seen at upper left hand corner of Fig. 5) is arranged a pawl and ratchet mechanism for intermittently rotating said feed screw, also a piston and cylinder forming part of the hydraulic operating mechanism for actuating this pawl and ratchet mechanism.

Figure 1:
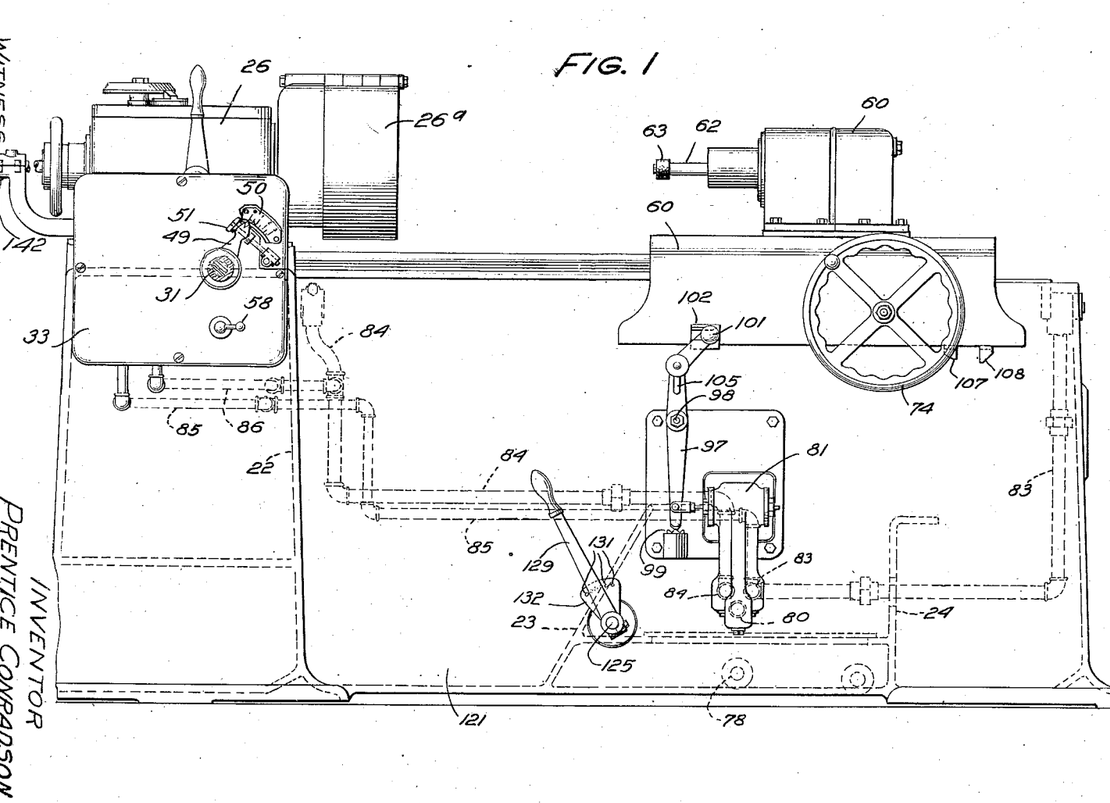
Fig. 1 is an elevation of the front side of a grinding machine embodying my invention.
Figure 11:
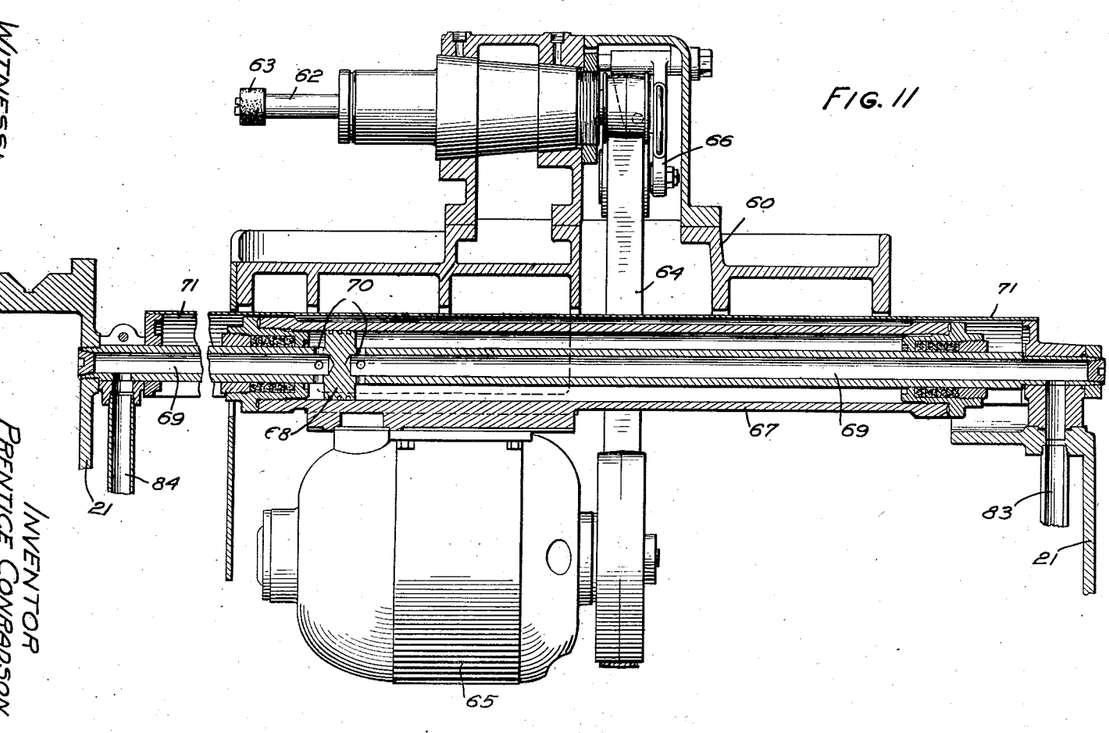
Fig. 11 is a longitudinal vertical section through the grinding spindle carriage and its operating means.

On the opposite end of the machine base is mounted a grinding spindle carriage to slide longitudinally of the base from an idle position, as seen in Fig. 1, to an operative position in which the grinding wheel enters the bore of the work carried by the spindle of the headstock carriage. A piston and cylinder is provided for moving the grinding spindle carriage, the cylinder being mounted on and traveling with said carriage as best seen in Fig. 11. The spindle of this carriage is driven by an electric motor which is also mounted on the underside of the carriage to travel therewith.

The two operating cylinders for the carriages are connected by pipes (best shown in Fig. 13) through a main control valve to a pump which draws its supply of actuating fluid, preferably oil, from a chamber within the base, to which chamber the spent oil is returned. The main control valve is actuated by an upright lever, best seen in Fig. 1, the upper end of which is arranged to be engaged by stops or dogs on the grinding spindle carriage to control the position of the lever and thereby the movable valve member. In the idle position of the grinding spindle carriage, seen in Fig. 1, this lever is in its neutral position so that no oil is being forced into either of the cylinders. When the operator wishes to start the machine after having secured a piece of work to its spindle in the headstock, he releases and swings the lever to cause oil to be forced into the left hand end of the spindle-carriage cylinder (as viewed in Fig. 13), also into the actuating cylinder for feeding the headstock carriage, thereby advancing the grinding spindle carriage to its operative position in which the grinding wheel enters the bore of the work, and also starting the feeding mechanism for the headstock carriage. The latter carriage may be manually advanced until the grinding wheel begins to take its cut. In the operating position of the grinding spindle carriage the two dogs which project from the lower right hand end of the carriage (Fig. 1) are caused alternately to engage a projection on the upright control lever and swing said lever back and forth automatically to reverse the main control valve and cause the oil under pressure to be forced alternately into the opposite ends of the two cylinders. When the required amount of grinding has been done, the operator moves the part on the main control lever out of the path of the dogs on the grinding spindle carriage so that said carriage will be automatically moved back to its idle position seen in Fig. 1, and at the same time the control lever will be automatically caught by a part on said carriage and held in its neutral position.

Referring now more particularly to the specific construction of the present embodiment of the invention, the machine comprises a hollow base casting 21, having an internal transverse wall 22 which separates the main portion of the base from the wider portion upon which the headstock carriage is mounted. Between the wall 22 and another transverse wall 23 is a chamber which contains the coolant fluid which is sprayed upon the work being ground, and between the wall 23 and a third transverse wall 24 is a reservoir which contains the oil constituting the hydraulic actuating fluid for the two carriage-operating cylinders.

The headstock carriage per se forms the subject matter of my copending application Ser. 619,123 filed February 15, 1923, while the grinding spindle carriage per se is described and claimed in my copending application Ser. No. 619,124 filed February 15, 1923. The present application covers the general construction of the entire machine, and particularly the mechanism for cooperatively actuating these two carriages.

*The headstock carriage and feeding mechanism.*

Figures 3, 4:
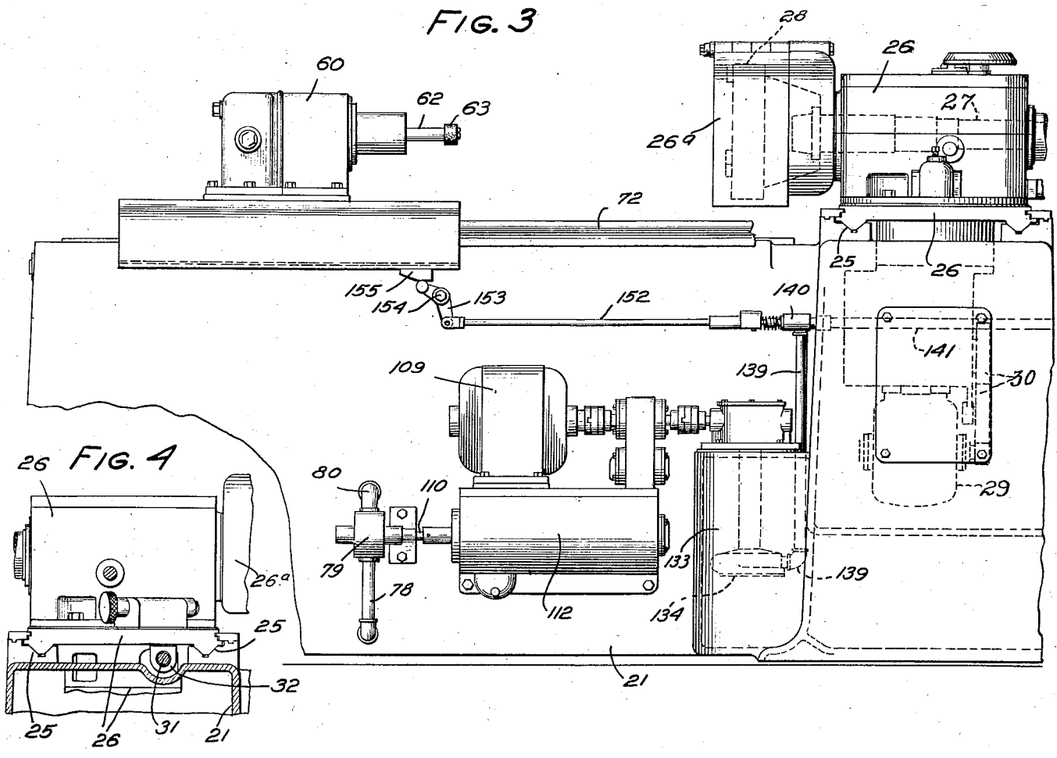
Fig. 3 is a rear side elevation of the machine.
Fig. 4 is a fragmentary view illustrating the means of mounting the headstock carriage.

Referring to Fig. 4, the base 21 has a pair of ways 25 extending transversely of the machine, upon which ways the headstock carriage 26 is slidably mounted. As fully disclosed in my copending application above referred to, this carriage has a rotary spindle 27 which carries at one end a suitable chuck or fixture 28 for holding the work to be ground, the spindle being driven by an electric motor 29 through suitable connections including change speed gearing 30. The motor and driving connections are mounted upon the underside of the carriage 26 to travel therewith. 26ª designates a hood which encloses the work-holding chuck or fixture.

The carriage is arranged to be fed along the ways 25 by a feed screw 31 mounted on the base and engaging in a nut 32 (Fig. 4) on the carriage 26. The outer end of the feed-screw shaft 31 extends into a so-called feed box 33 and a ratchet wheel 34 within said feed box is fixed on the feed screw and is intermittently rotated by small degrees by means of a pawl 35 pivoted at 36 upon an arm 37, the pawl being drawn toward the ratchet wheel 34 by a spring 35ª.

The said arm 37 is mounted upon the axis of the ratchet wheel and is connected to the moving element of a piston and cylinder unit so as to be reciprocated thereby. The connecting means comprises a pair of toggle links 38, 39 having their remote ends connected respectively to the arm 37 and to a fixed pivot 40, the link 39 being connected between its ends by a link 41 to a stud projecting from a cylinder 42, which in this instance is the reciprocating element. This cylinder is mounted to slide in a suitable guide housing 43. A stationary piston 44 within the cylinder 42 is held in place by oppositely extending rods 45 which are tubular and which have transverse bores at their inner ends through which pressure fluid is introduced into the cylinder and escapes therefrom. The ends of the rods 45 are stationarily supported in the ends of the guide housing 43.

In each reciprocation of the cylinder 42, the pawl 35 will be moved up and down to impart a partial revolution to the feed screw 31. In this way the pawl itself is given a constant length of feeding movement, but means is provided for varying the effect of this movement upon the ratchet wheel 34 so as to vary the rate of feed of the headstock carriage. This means comprises an arcuate shield 47 overlying a portion of the periphery of the ratchet wheel 34 and mounted upon an arm 48 which is pivoted upon the axis of the feed screw 31, said arm being connected to and operable by an indicator arm 49 (see Fig. 1) located outside of the feed box 33 and cooperating with a stationary scale 50. A screw 51 engages the indicator arm 49 and by rotating said screw the position of the shield 47 may be varied so that the pawl in its return stroke may be caused to ride up on said shield with a result that the beginning of the movement of the pawl will be idle and will not become effective until it drops off the shield and engages a tooth of the ratchet wheel.

Figure 10:
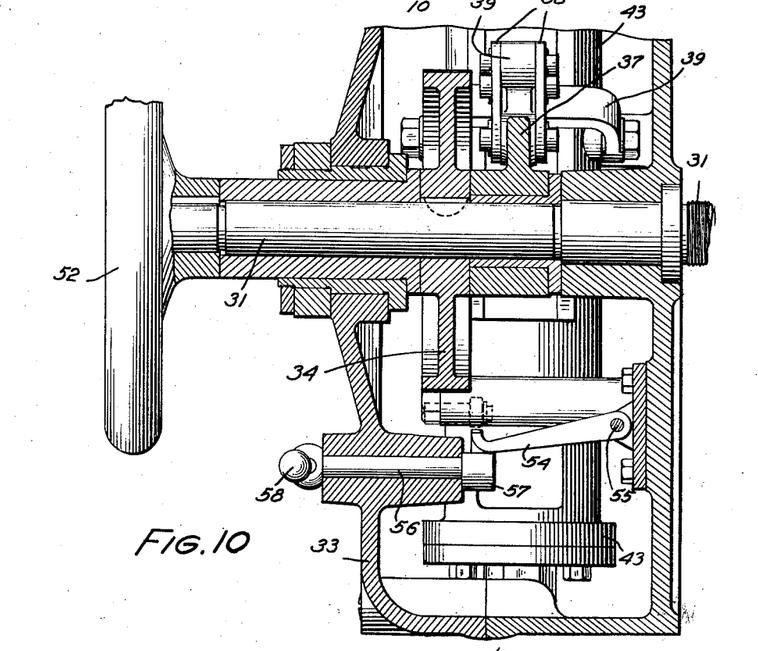
Fig. 10 is a vertical section in the plane of line 10 of Fig. 9.

Upon the end of the feed screw 31 outside of the feed box 33 is fixed a hand wheel 52 to permit of manual sliding of the headstock carriage 26 and means is provided for holding the pawl 35 in an inoperative position temporarily to permit of such manual movement of said carriage in either direction while the pawl is reciprocating. This means comprises an arm 53 fixed with relation to the pawl and having on its free end a roller which is arranged to bear against the concave end of an arm 54 which is pivoted at 55 (Fig. 10) to the wall of the feed box. A shaft 56 has an eccentric 57 fixed on one end which underlies the free end of the arm 54, said shaft having on its other end outside of the feed box an arm 58 by which the operator may rotate said eccentric and raise or lower the arm 54. When the arm 54 is in its lower position, the pawl will engage the ratchet wheel and when the arm is raised the pawl will be held in inoperative position, the roller on the arm 53 running idly back and forth on the arm 54 in the reciprocation of the pawl.

*The grinding spindle carriage.*

Figure 12:
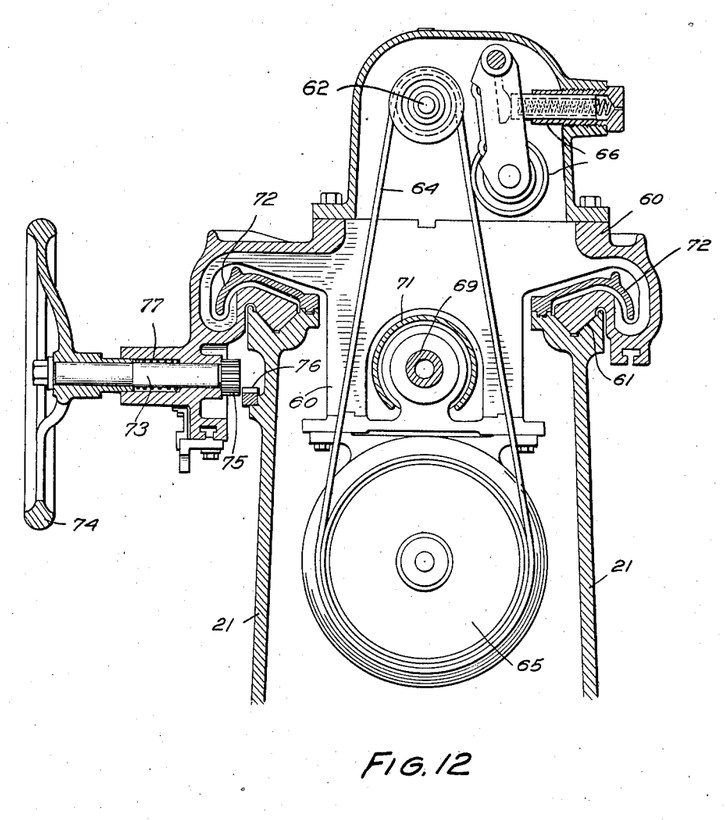
Fig. 12 is a transverse vertical section through the grinding spindle carriage.

The grinding spindle carriage 60 (Figs. 11 and 12) is mounted to reciprocate on ways 61 running lengthwise of the machine base, the sides of the carriage overhanging the side walls of said base. A spindle 62 has a grinding wheel 63 thereon and is driven by a belt 64 from an electric motor 65 mounted upon the underside of the carriage to travel therewith. 66 designates a suitable belt tensioner.

This carriage is arranged to be reciprocated by a piston and cylinder unit, one element of which is mounted on the carriage to travel therewith. Preferably the cylinder 67 is fixedly mounted on the underside of the carriage and the piston 68 is stationary and is carried by hollow rods 69 which have their ends mounted in the machine base.

These rods and the piston may be turned out of an integral piece of metal. On opposite sides of the piston the rods have transverse ports 70 through which pressure fluid is introduced into and escapes from the cylinder. 71 designates a shield which completely encloses the cylinder, piston and rods, except for a slot at the lower side, to protect these parts from splashing coolant. The ways 61 are protected from splashing coolant by guards 72 fixed on the machine base and overhanging the said ways and being coextensive therewith.

In the front side of the carriage is mounted a shaft 73 having a hand wheel 74 fixed on its outer end and a pinion 75 fixed on its inner end and arranged to be moved into mesh with a rack bar 76 fixed on the machine base. A spring 77 normally holds the pinion 75 out of mesh with said rack. When it is desired to move the carriage 60 manually the operator pushes on hand wheel 74 to slide the shaft 73 (Fig. 12) and move pinion into mesh whereupon by rotating the hand wheel, the carriage may be moved in either direction along the base.

The operating mechanism.

The hydraulic pressure fluid, preferably oil, is drawn from the oil reservoir within the machine base through a pipe 78 (Figs. 1, 2, 3 and 5) into an oil pump 79 which may be of any suitable type, and from this pump the oil is discharged through a pipe 80 into a main control valve 81 and the spent oil is returned from this valve through a pipe 82 (Fig. 5) to the oil reservoir. The valve 81 is connected to the opposite ends of the hollow piston rods 69 for the grinding spindle carriage by pipes 83 and 84, and branch pipes 85 and 86 (Fig. 13) connect pipes 83 and 84 respectively with the opposite ends of the hollow piston rods 46 of the headstock carriage feed mechanism. 80ª designates a relief valve in the pipe 80.

Figure 14:
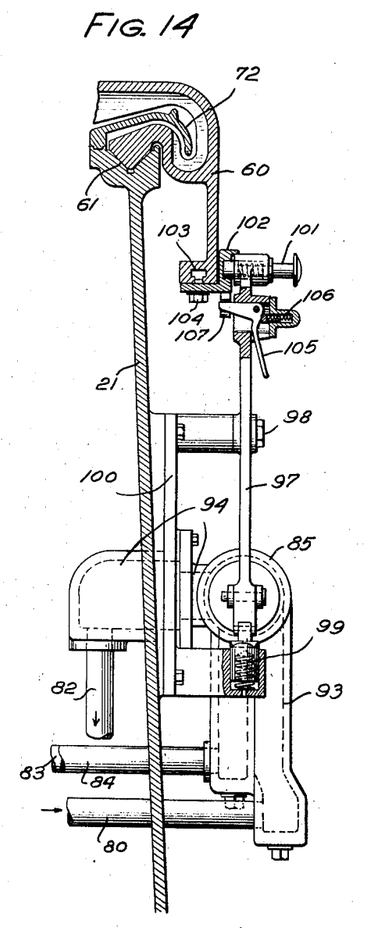
Fig. 14 is a vertical sectional view illustrating the means for controlling the hydraulic operating mechanism.
Figure 15:
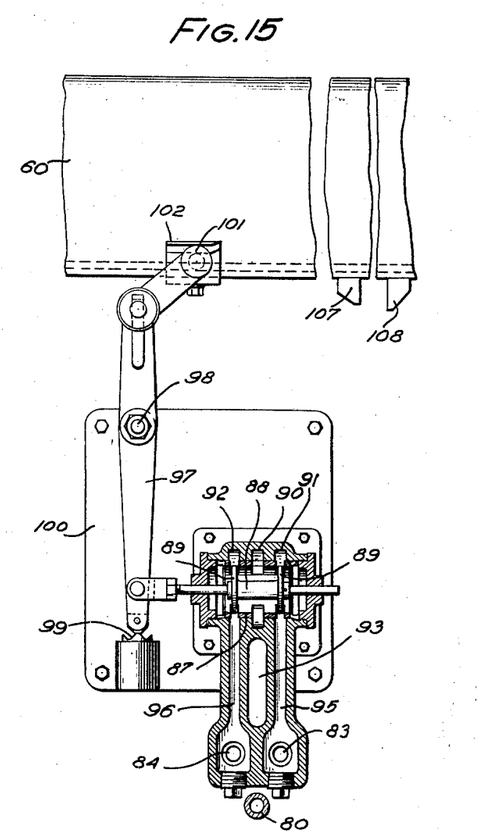
Fig. 15 is an elevational view of the control mechanism seen in Fig. 14, the main control valve being shown in vertical section.
Figure 16:
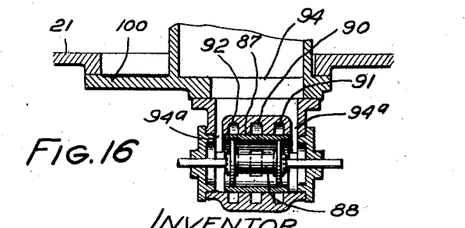
Fig. 16 is a horizontal section through said main control valve.

The main control valve 81 in the preferred form the details of which are shown by way of example in Figs. 14, 15 and 16, comprises a cylindrical body portion which may have an internal hardened bearing sleeve 87 in which the movable valve member 88 is slidably mounted. This valve member 88 has two spaced radial flanges 89 fitting within the sleeve 87. The said cylindrical body portion has a central chamber 90 and two end chambers 91, 92, of annular form surrounding the sleeve 87 and valve member 88, said sleeve having openings through which the interior of the sleeve communicates with all of said chambers. An intake passage 93 communicates with the intake pipe 80 and leads up to the central chamber 90. Another passage or chamber 94, which is in constant communication with both ends of the sleeve 87 through spaces 94ª (Fig. 16), delivers the oil to the return pipe 82 through which the oil flows back into the reservoir. Separate passages 95 and 96 lead from the end chambers 91 and 92 respectively and communicate with pipes 83 and 84 leading to the cylinders.

When the valve member 88 is in its central or neutral position seen in Fig. 15 the oil which is constantly being circulated by the pump 79 is bypassed through the valve 81 from the pipe 80 through passage 93, through central chamber 90, to the interior of sleeve 87, thence around the flanges 89 which are in register with the wider openings in the sleeve and thus permit such leakage. The oil then escapes from both ends of this sleeve and flows through spaces 94ª, through passage 94, to the return pipe 82, and thence to the reservoir. The pressure of the oil is balanced against the two valve flanges 89 and does not affect the valve.

Figure 13:
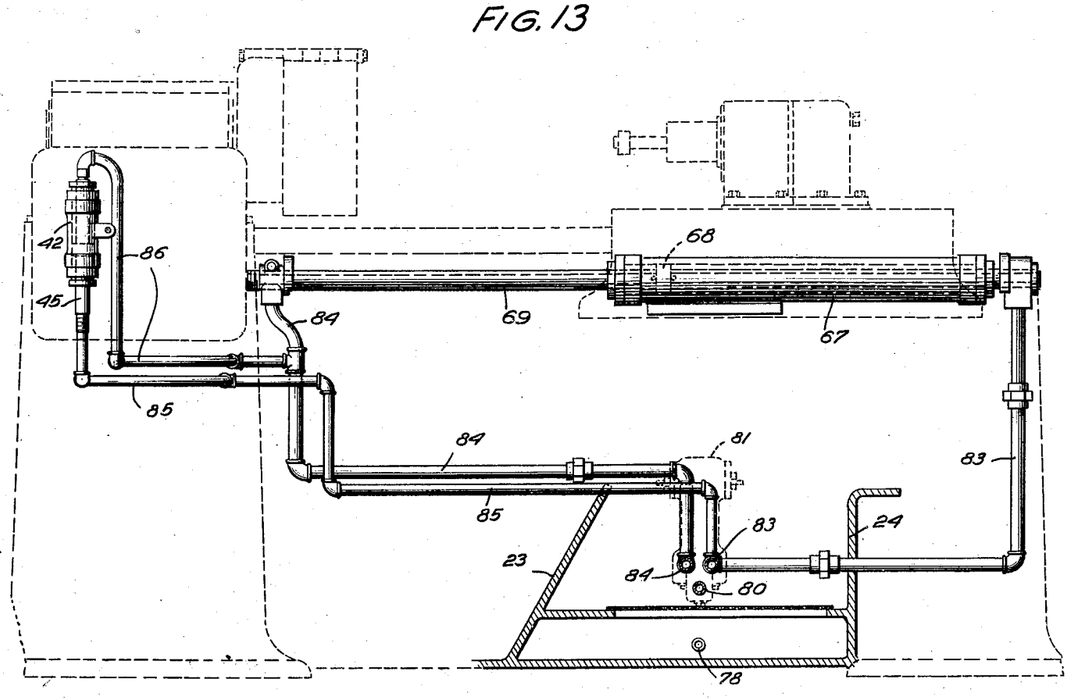
Fig. 13 is a diagrammatic view illustrating the hydraulic operating means for the carriages.

When the valve member 88 is moved to the left, as viewed in Fig. 15, oil coming in through pipe 80 and passage 93 will flow through chamber 90 through the interior of sleeve 87 into chamber 92 through passage 96 and pipe 84 into the left hand end of the grinding spindle carriage cylinder 67 as viewed in Fig. 13. Said carriage will thereby be moved to the left or toward the headstock carriage. In this movement the oil in the right hand end of the cylinder 67 escapes through pipe 83, passage 95 in the main control valve, through chamber 91, through the interior of the sleeve 87, and thence through the space 94ª and chamber 94 into the return pipe 82.

When the valve member 88 is moved to the right, oil will be conducted from the intake pipe 80 into the right hand end of the cylinder 67 through the passages and chambers 93, 90, 87, 91, 95, 83, and oil will be exhausted from the left hand end of said cylinder through pipe 84, and the passages and chambers 96, 92, 87, 94ª, 94, 82, into the oil reservoir. The carriage 60 will thereby be moved to the right or away from the headstock carriage.

The stem of the movable valve member 88 is pivotally attached to an upright valve-actuating lever 97 which is pivoted between its ends at 98. The lower end of the lever is wedge shaped and is arranged to cooperate with a spring pressed plunger 99 having two notches between which is a flat face to coact with a flat face on the end of the wedge on the lever. When these faces are in engagement, the lever and valve member 88 are in neutral position. When moved in either direction from this position the plunger 99 tends to move and hold the lever in one extreme position or the other. In the present instance the valve 81, the pivot 98 for the lever 97 and the plunger 99 are shown as mounted upon the unitary base plate 100 which is secured to the base 21 of the machine.

In the extreme upper end of the lever 97 a spring-pressed detent 101 is slidably mounted, the inner end of which is arranged to engage in a cam slot in a block 102 that is adjustably secured to the side wall of the carriage 60. In the present instance the lower edge of this side wall has a T-slot 103 therein to receive a bolt 104 by which the block 102 may be secured in place.

The lever 97 also carries near its upper end a pivoted dog 105 which is acted upon by a spring plunger 106 to maintain one end of the dog in operative position in the path of dogs 107 and 108 which are adjustably secured to the carriage 60 by bolts engaging in the T-slot 103.

Assuming the carriage 60 to be in the position seen in Fig. 1, when the operator desires to start the machine he pulls outwardly on the pin 101 and swings the upper end of the lever 97 to the right thereby shifting the valve member 88 to the left as viewed in Fig. 15. This will cause the carriage 60 to move to the left until the dog 108 comes into engagement with the dog 105 on the lever 97, the beveled end of the dog 107 pushing the end of the dog 105 downwardly out of its way and the dog 105 snapping back into position between dogs 107 and 108. The dog 108 by engagement with the dog 105 will swing the upper end of the lever 97 to the left and shift valve member 88 to its extreme right-hand position, thereby reversing the flow of oil to the cylinder 67 and starting the carriage 60 to move to the right. When the dog 107 engages the dog 105 the lever 97 and valve member 88 will again be shifted to reverse the carriage. The cariage thereby reciprocates through a distance depending upon the spacing of the dogs 107, 108, and this spacing corresponds with the length of the bore in the piece of work to be ground so that the grinding wheel 63 will travel from one end of the bore to the other in the reciprocations of the carriage.

It is desirable that the feeding movement of the headstock carriage take place at one end of the stroke of the grinding wheel carriage. As is shown most clearly in Figure 13, the cylinders 42 and 67 are of unequal size, the length of the stroke of the cylinder 67 being many times that of the cylinder 42, and the internal diameter of the cylinder 67 also being considerably greater than that of the cylinder 42. Furthermore, the load to be moved or work done by the cylinder 42 is much less than that of the cylinder 67. For these reasons, at each reversal of the control valve 81, the cylinder 42 will quickly make its complete stroke at the very beginning of the movement of the cylinder 67. This results in complete feeding movement being imparted to the work while the grinding wheel is at one end of its stroke.

Figure 2:
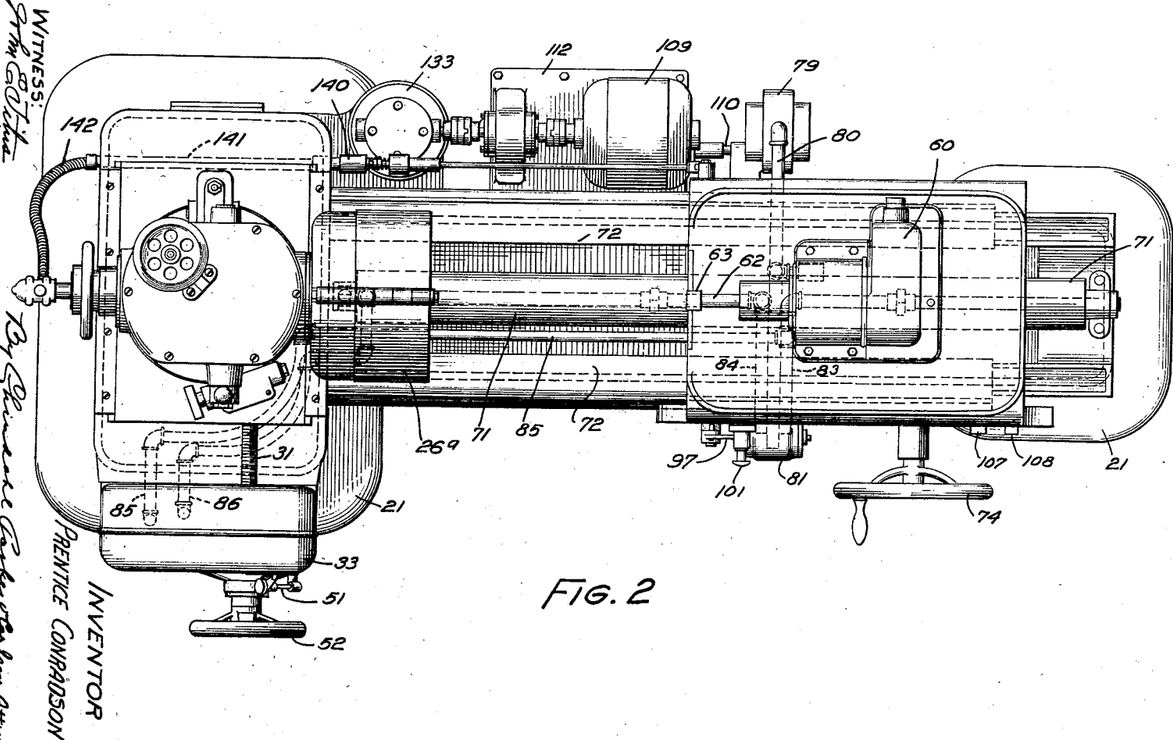
Fig. 2 is a top plan view of the machine.
Figure 5:
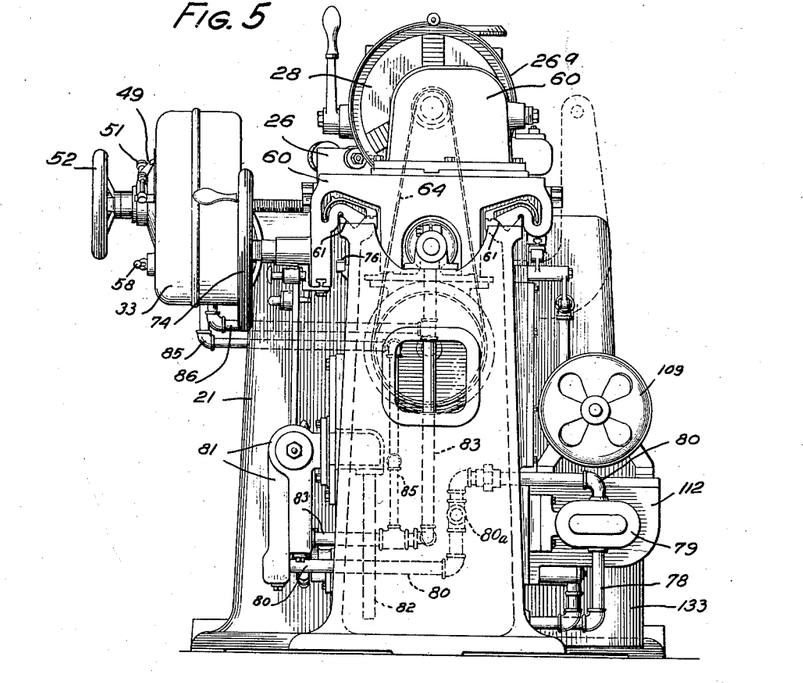
Fig. 5 is an end elevation of the machine looking at the right hand end of Figs. 1 and 2.
Figure 17:
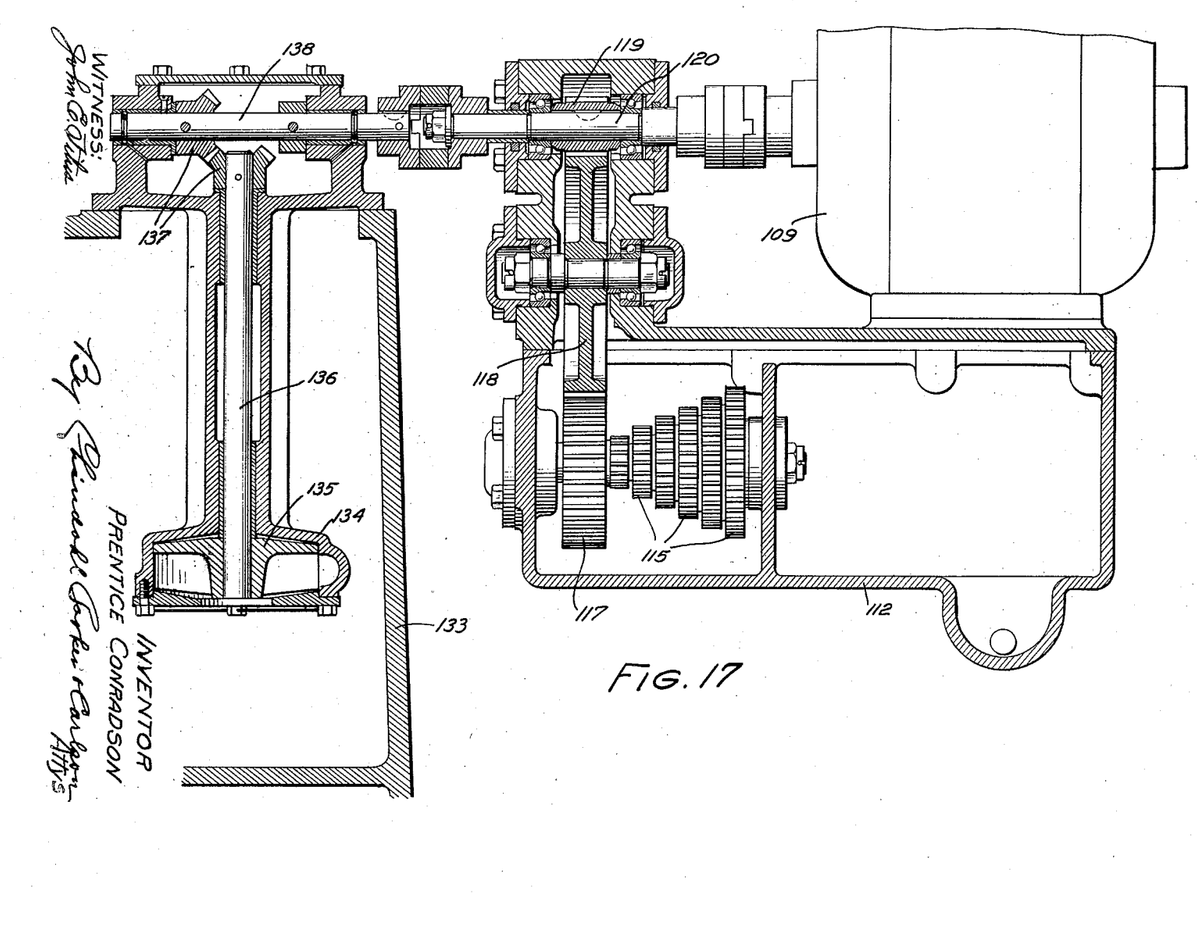
Fig. 17 is a vertical sectional view through the coolant circulating pump showing the motor and connections for driving said pump and the pump for the hydraulic actuating fluid.
Figure 18:
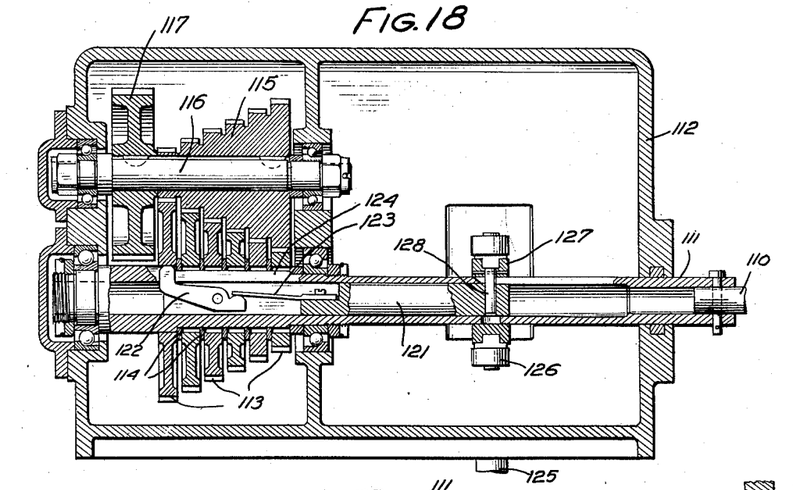
Fig. 18 is a horizontal section illustrating the change speed driving gearing for the hydraulic fluid pump.
Figure 19:
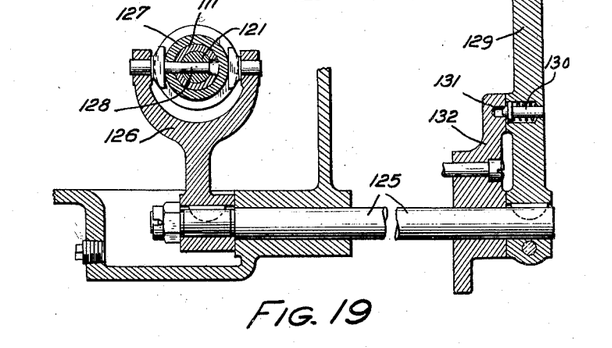
Fig. 19 is a vertical section illustrating the manual means for operating said change speed gearing.

The oil pump 79 may be of any common or preferred construction, for example, a rotary gear pump, and it is driven from a motor 109 which is seen in Figs. 2, 3 and 5, through the medium of change speed gearing illustrated in detail in Figs. 17, 18 and 19, by means of which gearing the speed of the oil pump and therefore the oil pressure and speed of reciprocation of the cylinders 42 and 67 are governed.

In the exemplary form of gearing which is shown in the drawings, the shaft 110 of the oil pump 79 enters a tubular shaft 111 (Fig. 18) which is journaled in the walls of a gear case 112. On one end of this shaft a cone of gears 113 is mounted, the gears being independently rotatable and being spaced apart by washers 114. These independently rotatable gears are in constant mesh with a solid cone gear 115 which is keyed on a shaft 116 journaled in the box 112. The shaft 116 also has a gear 117 keyed thereon which is driven through the medium of an intermediate gear 118 from a pinion 119 that is fixed on a shaft 120 which, in the present instance, is an extension of the armature shaft of the motor 109.

Means is provided for locking any desired one of the gears 113 to the shaft 111, said means in the present instance comprising a shaft 121 slidably mounted within the tubular shaft 111 and having a slot at one end in which is pivoted a key 122. A spring 123 carried by shaft 121 bears upon one end of the key 122 and tends to press the opposite angular end of said key outwardly. This angular end passes through a slot 124 in the shaft 111 and is arranged to engage in a groove within the hub of any one of the gears 113. By shifting the shaft 121 longitudinally the key 122 may be moved into engagement with the desired gear. The angular end of the key is beveled and in the shifting movement the beveled end engages the intermediate washers 114 and withdraws the key fully from one gear before the key engages the next adjacent gear.

The means herein shown for shifting the shaft 121 longitudinally comprises a shaft 125 (Fig. 19) upon one end of which is fixed a yoke 126 which engages in an annular groove in a collar 127 surrounding the shaft 111. This collar is attached to the shaft 121 by means of a pin 128 passing through a longitudinal slot in the shaft 111 and into shaft 121 as seen in Fig. 18.

The opposite end of the shaft 125 projects through the forward side of the machine base 21 and has fixed thereon a hand lever 129 (Fig. 1) by means of which the operator may conveniently shift the key 122 and change the speed of the oil pump 79. In the present instance the hand lever carries a spring pressed detent 130 having a conical end to engage in any one of a series of recesses 131 in a stationary plate 132 so that the hand lever will be yieldingly held in any desired position.

As hereinbefore stated, the coolant which is constantly directed upon the work or the grinding wheel during the grinding operation is contained in a reservoir in the base of the machine formed between the walls 22 and 23. Means is provided for continuously circulating the coolant during the grinding operation and for automatically cutting off the circulation when the grinding spindle carriage 60 recedes from its grinding position.

Figure 6:
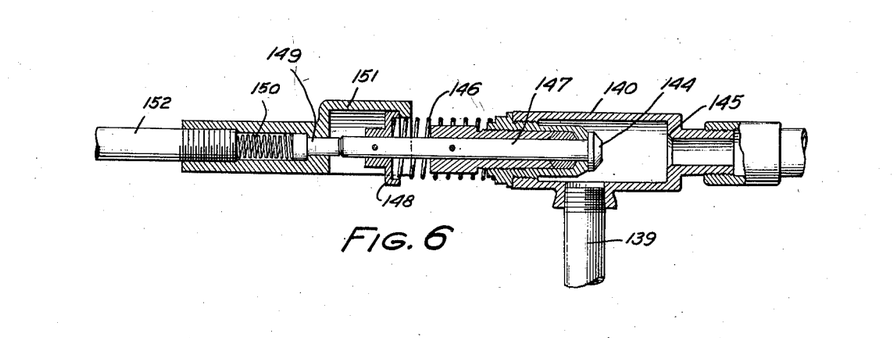
Fig. 6 is a sectional view illustrating the valve by which the flow of coolant fluid is controlled.
Figures 7, 8:
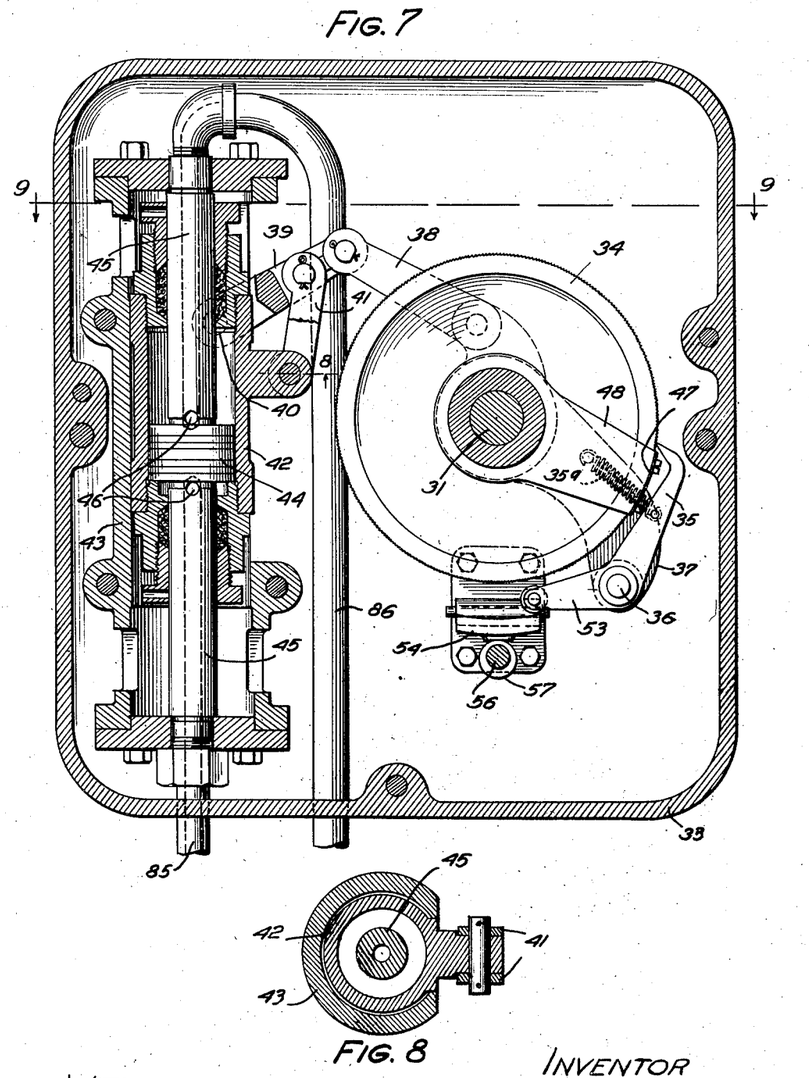
Fig. 7 is a vertical sectional view illustrating the mechanism for feeding the headstock carriage.
Fig. 8 is a sectional detail in the plane of line 8 of Fig. 7.
Figure 9:
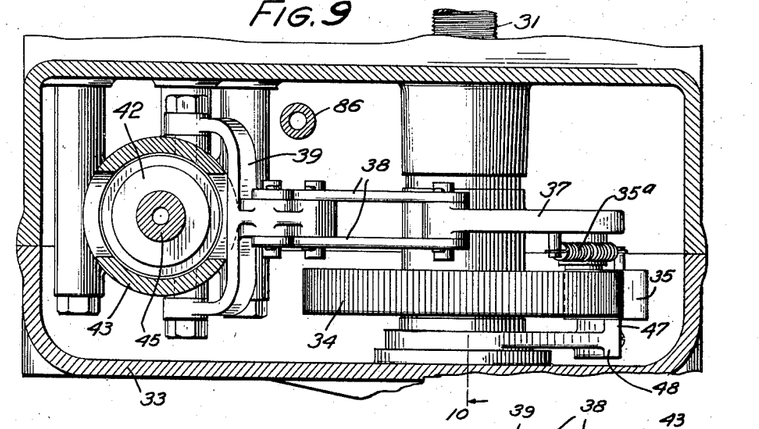
Fig. 9 is a horizontal section in the plane of line 9—9 of Fig. 7.

Referring to Figs. 2, 3 and 17, 133 designates a pump chamber which forms a part of the coolant reservoir in the base. In this chamber is mounted a rotary pump 134 which, in the exemplary form shown, comprises a housing open at its lower end and having therein a rotor 135 (Fig. 17) fixed on a shaft 136, the upper end of which shaft is connected by beveled gears 137 to a drive shaft 138. This shaft, in the present instance, is coaxial with and coupled to the shaft 120 to be driven therefrom by means of the same motor 109 which drives the oil pump. A pipe 139 (Fig. 3) leads from a peripheral portion of the housing of the pump 134 to the casing of a valve 140 which is shown in Fig. 6. This valve casing is connected by pipe 141 and a flexible conduit 142 (Fig. 2) to one end of the spindle 27. This spindle is hollow or tubular and from its opposite end the coolant is discharged upon the grinding wheel and the piece of work held by the chuck or fixture which is secured to said spindle. The coolant falls back into the reservoir to be again circulated by the pump 134.

The manner in which the circulation of coolant is automatically cut off will now be explained. The valve 140 comprises a valve member 144 which cooperates with a seat 145 to cut off the flow of coolant through the valve. The valve is normally maintained in open position by means of a coiled spring 146 surrounding the valve stem 147, bearing at one end against the casing 140 and at its other end against a collar 148 which is fixed on the valve stem. The outer end of the stem 147 bears against a plunger 149 which is backed up by a spring 150, said plunger and spring being mounted in a coupling member 151. This member rests upon the collar 148 and has a flange at its end overhanging said collar. The opposite end of member 151 is connected by a rod 152 to a lever 153 (Fig. 3) pivoted at 154 to the machine base, the upper end of said lever being in position to be engaged by a cam dog 155 carried by the carriage 60. This dog may be adjustably secured in an undercut slot in the same way as are dogs 107, 108.

When the carriage 60 is in its grinding position the valve 140 will be in the open position seen in Fig. 6, so that coolant may freely flow through the valve. At the completion of the grinding operation when the carriage 60 moves back to the position seen in Fig. 3, the dog 155 will rock the lever 153 and move rod 152 to the right, thereby seating valve member 144. The spring 150 and plunger 149 will yield as the valve seats and will resiliently hold the valve closed.

I claim as my invention:

1. A grinding machine having, in combination, a carriage having an idle position and a position in which it reciprocates, a piston and cylinder unit for moving said carriage, a control valve connected to a source of pressure fluid and to said piston and cylinder unit, a valve operating device, means on said carriage for moving said device when the carriage is in its reciprocating position to automatically reverse said valve and effect reciprocation of said carriage, and means on the carriage for operating said device when the carriage is at its idle position to move said valve to its neutral or inactive position and thereby stop reciprocation of said carriage.

2. A grinding machine having, in combination, a slidably mounted carriage, pressure fluid means for reciprocating said carriage including a control valve, a lever for operating said valve, and a stop on said carriage arranged to engage said lever and move said valve to neutral position to discontinue the movement of said carriage.

3. A grinding machine having, in combination, a reciprocatory carriage, a cylinder mounted on said carriage, a piston in said cylinder, hollow piston rods extending in opposite directions from the piston through the cylinder and being stationarily mounted, means for introducing pressure fluid through said rods into the cylinder at opposite sides of said piston, a control valve for controlling the flow of pressure fluid, and means operated by the carriage in its movement for actuating said control valve.

4. A grinding machine having, in combination, a reciprocatory carriage having an idle position and an operative position, pressure fluid means for moving said carriage including a control valve, an operating device for said valve, means on said carriage to actuate said operating device when the carriage approaches its idle position to move the valve to neutral position, and separate means on said carriage which automatically comes into operative relation to said operating device in the movement of said carriage from idle to operative position for automatically reciprocating said operating device to reverse said control valve and thereby effect continuous reciprocation of said carriage in its operative position.

5. A grinding machine having, in combination, a carriage having an idle and an operative position, pressure fluid means including a reversible control valve for moving said carriage, a valve actuator, means on said carriage to hold said actuator in a position to keep said valve neutral, a yielding part on said actuator and a pair of dogs on said carriage arranged to alternately engage said yielding part to reciprocate said actuator and reverse said valve, one of said dogs moving said yielding part out of its way as the carriage travels from idle to operative position, and said yielding part then moving into position between said dogs so as to be alternately engageable by the dogs in the reciprocation of the carriage.

6. A grinding machine having, in combination, a carriage, a piston and cylinder unit for moving said carriage, means for supplying liquid under pressure to said piston and cylinder unit, a control valve for governing the flow of said liquid, means for manually actuating said control valve, and manual means for varying the speed of said liquid-supplying means and thereby the speed of operation of said piston and cylinder unit, said valve actuating means and said varying means being located within convenient reach of the operator when standing alongside said carriage.

7. A machine of the character described having, in combination, a carriage having an operative position and an idle position remote from said operative position, and mechanism arranged to reciprocate the carriage in its operative position to return the carriage to its idle position and to automatically stop the carriage at its idle position.

8. A grinding machine having, in combination, a carriage, a feed screw for moving said carriage, manual means for rotating said feed screw, a ratchet wheel secured to said feed screw, a pawl lever loosely mounted on said feed screw next to said ratchet wheel, a pawl carried by said pawl lever for engaging said ratchet wheel, said pawl having a rearwardly extending arm, power means for oscillating said pawl lever, and manually operable means for engaging said pawl arm to hold said pawl out of engagement with said ratchet wheel during the oscillation of said lever to permit manual rotation of said lever to permit manual rotation of said feed screw.

9. A grinding machine having, in combination, two carriages mounted to slide in paths at right angles to each other, a piston and cylinder unit connected to reciprocate one carriage, a second piston and cylinder unit, means including said last mentioned unit for feeding said other carriage, a liquid reservoir, a pump connected to draw liquid from said reservoir, a main control valve connected with the discharge side of said pump, pipes connecting said control valve with opposite ends of said piston and cylinder units, said piston and cylinder units being connected in parallel, means governed by the movement of one of said carriages for actuating said control valve, and means for varying the speed of said pump.

10. A grinding machine having, in combination, a reciprocating carriage having an idle and an operative position, a cylinder secured to the under side of said carriage for movement therewith, a piston rigidly mounted with respect to said carriage and operatively associated with said cylinder, said piston having hollow piston rods opening into said cylinder adjacent the opposite ends of the piston head, pressure fluid means for moving said cylinder, a control valve, an operating device for said valve, means on said carriage to actuate said operating device when the carriage approaches its idle position to move said valve to neutral position, and separate means on said carriage for automatically engaging said operating device in the movement of said carriage from idle to operative position for automatically reciprocating said operating device to reverse said control valve and thereby effect continuous reciprocation of said carriage.

11. A grinding machine having, in combination, a carriage having an idle and an operative position, pressure fluid means including a reversible control valve for moving said carriage, a valve actuator, a spring pressed detent carried by said actuator, means on said carriage for engaging said detent to move said valve to neutral position and hold it there, a spring pressed dog carried by said actuator, and a pair of dogs on said carriage arranged to alternately engage said spring pressed dog to reciprocate said actuator and reverse said valve, one of said carriage dogs moving said spring pressed dog out of its way as the carriage travels from idle to operative position and said yielding dog then moving into position between said carriage dogs so as to be alternately engageable by said dogs as the carriage reciprocates.

In testimony whereof, I have hereunto affixed my signature.

PRENTICE CONRADSON.